United States Patent [19]

Staron

[11] Patent Number: 5,805,230

[45] Date of Patent: Sep. 8, 1998

[54] METHOD FOR AUTOMATIC PROGRAMMING OF A TUNER AND DEVICE FOR IMPLEMENTATION OF THE METHOD

[75] Inventor: Alain Staron, Paris, France

[73] Assignee: Thomson Multimedia, Courbevoie, France

[21] Appl. No.: 583,006

[22] PCT Filed: Mar. 1, 1995

[86] PCT No.: PCT/FR95/00238

§ 371 Date: Jun. 14, 1996

§ 102(e) Date: Jun. 14, 1996

[87] PCT Pub. No.: WO95/24098

PCT Pub. Date: Sep. 8, 1995

[30] Foreign Application Priority Data

Mar. 1, 1994 [FR] France .................................. 94 02332

[51] Int. Cl.[6] .................................................. H04N 7/10
[52] U.S. Cl. ......................... 348/460; 348/465; 348/468; 348/732; 348/10
[58] Field of Search .................................... 348/9, 10, 12, 348/13, 6, 7, 731, 732, 460, 465, 468, 461, 569

[56] References Cited

U.S. PATENT DOCUMENTS

| 4,805,020 | 2/1989 | Greenberg | 348/460 |
| 5,432,542 | 7/1995 | Thibadeau et al. | 348/9 |
| 5,446,919 | 8/1995 | Wilkins | 348/10 |
| 5,515,173 | 5/1996 | Mankovitz et al. | 348/732 |

*Primary Examiner*—Victor R. Kostak
*Attorney, Agent, or Firm*—Oblon, Spivak, McClelland, Maier & Neustadt, P.C.

[57] ABSTRACT

The disclosure is an automatic programming method for a tuner of a television and/or video recorder that makes use of data received by cable or terrestrial or satellite radio, and a device implementing this method. The method involves the transmission of a set of channel tables, each corresponding to a broadcasting station, using the CEEFAX standard. The television or video recorder memorizes the table corresponding to the postal ZIP code previously input by the user, then automatically programs the tuner. The invention is applicable for all types of television standards (PAL, PAL+, SECAM, NTSC, D2MAC, HDMAC, digital standards, etc.) and to all types of signal formats transmitted with the video signals.

9 Claims, 3 Drawing Sheets

METHOD FOR AUTOMATIC PROGRAMMING OF A TUNER AND DEVICE FOR IMPLEMENTATION OF THE METHOD

BACKGROUND OF THE INVENTION

1. Field of the Invention

The invention concerns a method for automatic programming of a television tuner and/or video tape recorder by making use of information broadcast by cable or by terrestrial or satellite transmission. The invention also includes a device implementing the method.

2. Discussion of the Background

When a television of video recorder is installed somewhere for the first time, the user must program the machine. In the case of radio transmission, TV programs are broadcast according to a frequency allocation plan composed of numbered channels each using a predetermined carrier frequency. To avoid interference it may be necessary to broadcast the same program on different channels in different geographic areas. It is therefore impossible to program TV tuners and recorders definitively and always in the same manner during fabrication. Programming of the receiver must be carried out after installation. To do this, the user must regulate the tuner to the channels used, recognize the stations and associate a channel number with each channel. This operation can be long and far from simple, especially in view of the ever-increasing number of channels. For this reason, manufacturers of televisions and video recorders use various systems to help the user during programming.

A first solution is to equip the tuner with a device that lock automatically onto the channels used. The user then only has to recognize each station and choose a corresponding number. Another solution is to equip the receiver with a receiver/decoder complying with the European CEEFAX teletext standard. Data transmitted by teletext enable a tuner to automatically associate a station's channel with the given number of the station. However, this system can work efficiently only if each station has its own teletext, which is not generally the case. To overcome these problems, another solution that has been suggested is to download by telephone the data representing the correspondence tables between the channels and the sequential numbers of the stations, that are identified by their corresponding postal (ZIP) code. The drawback of this system is that the television or its remote controller must incorporate a modem.

SUMMARY OF THE INVENTION

The present invention provides for totally automatic programming of a television tuner or video recorder, applicable whatever its geographic location, by making use of a method used in a very simple device that, compared with present-day machines, requires only the addition of a rewriteable memory and the transmission of some special signals.

The invention is therefore a method for automatic programming of a television tuner and/or video recorder, applicable whatever the geographic location of the device, making use of an analog or digital composite videofrequency signal transmitted by cable, or terrestrial or satellite radio, characterized in that it includes the following steps:

reception of digital data carried by part of a multiplexed digital data stream of said videofrequency signal, or at least part of the signal not used for video information, these digital signals representing an identification code and at least the channel tables each corresponding to a transmitting station and identifiable by one or more postal ZIP codes;

recognition of the identification code of the signal by comparison with a memorized code;

reading of the data carried by the signal;

identification of the channel table of the transmitting station serving the geographic location of the tuner, by making use of the ZIP code of this location input by the user;

recording in memory of the channel table corresponding to the selected ZIP code;

automatic programming of the tuner by making use of these data.

The digital data carried by the signal are preferably teletext-type data complying with the CEEFAX standard. The present invention also includes a device implementing the programming method described above and used for automatic programming for a television tuner and/or video recorder that includes a transmitter, a tuner, a CEEFAX decoder, a microprocessor and a user interface.

During installation of the television, the programming of the receiver using the method according to the invention requires no operation by the user, other than the input of his ZIP code via the keypad of the remote controller.

Another advantage of the invention is that it can adapt to all changes or reorganizations of the channel allocations for broadcasting by radio, cable or satellite since the user can update his programming of his receiver at any time by repeating the procedure. Moreover, the TV could even update its programming automatically and regularly, for example once every month.

BRIEF DESCRIPTION OF THE DRAWINGS

The invention will be better understood and other advantages will become clear on reading the following description making reference to the appended figures, of which.

DESCRIPTION OF THE PREFERRED EMBODIMENTS

Some television stations offer a teletext service that involves the transmission along with the video signals of digital signals corresponding to a number of pages of information that can be displayed on the screen, for example, the Teletext service complying with the European videotext format. These pages can contain information updated regularly, such as the weather forecast, news, program times, etc.

Figure 1:
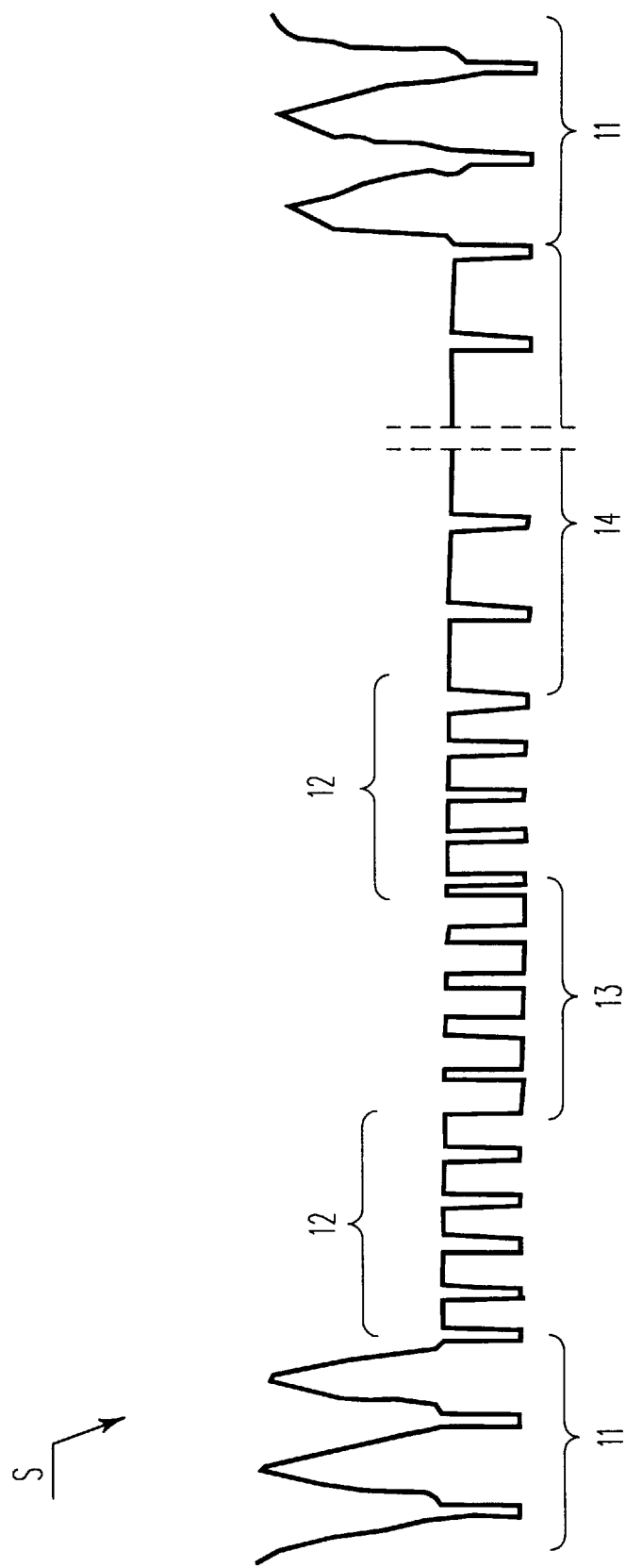
FIG. 1 shows an example of a video signal that can carry the special signals required for the programming method according to the invention.

FIG. 1 shows the frame retrace part of an example of a composite videofrequency signal S complying with the French L-L' standard. Parts 11 correspond to the video signal itself, in other words the line scanning (in this case 625 lines) whose width is 1/fh, where fh is the line frequency. Parts 12 and part 13 of the signal are respectively equalization pulses and frame pulses (frame signals causing return of the spot to the top of the image at the start of an even or odd frame), each having a width of ½fh.

Part 14 corresponds to the lines left black (blanking lines, of which there are 24 in our example) used to carry various signals, for example Teletext signals. The total period of this signal S is 1/ft, ft being the frame repetition rate.

The main purpose of the present invention is to use some of these black lines (for example, lines 5 and 6) to transmit special signals that are digital signals containing channel tables. Each of these tables corresponds to a ZIP code and contains the correspondence between the list of stations (identified by their names and/or numbers) and the list of channels (identified by their frequencies), this correspondence being characteristic of the geographic site identified by a ZIP code. In some cases, there may also be several different tables for a given ZIP code. Preferably, the TV receiver can then, by means of criteria indicating the quality of the reception, automatically choose the table whose data provide the best reception. For example, a practical criterion would be the level of each channel given by the automatic gain control (AGC) circuit of the tuner, which generates a voltage to adjust the amplifier gain. This voltage can be memorized for each channel of one of the selected tables. A second routine eliminates duplicate channels (i.e. those having the same identification), preserving only the one offering the best reception.

In the case of digital transmissions (MAC, digital formats), the signals used for the programming have a reserved place in the stream of digital data. These signals can therefore be extracted and the data related to programming processed using the method according to the invention.

In the case of analog transmissions, these signals preferably are in CEEFAX format and are displayed on special Teletext-type pages and are carried by one or more of the black lines (for example, lines 5 and 6) of the video signal. The special pages containing these channel tables are associated with an identification code (in the case of CEEFAX signals these codes are simply the teletext page numbers used) that devices implementing the method according to the invention can recognize by frequency scanning, by using the same memorized code (for example, pages 10, 11 and 12). After having recognized this identification code, the devices stop the frequency scanning and the data are read. The data corresponding to the ZIP code entered by the user are possibly stored in a memory, in order to program the TV tuner or video recorder. During installation of these devices, the user enters the ZIP code of the location of installation and the device then programs itself automatically after reading the transmitted data (or by seeking the corresponding table in memory, in the case where the device has memorized the data). It then associates the station with the right corresponding channel.

Figure 2:
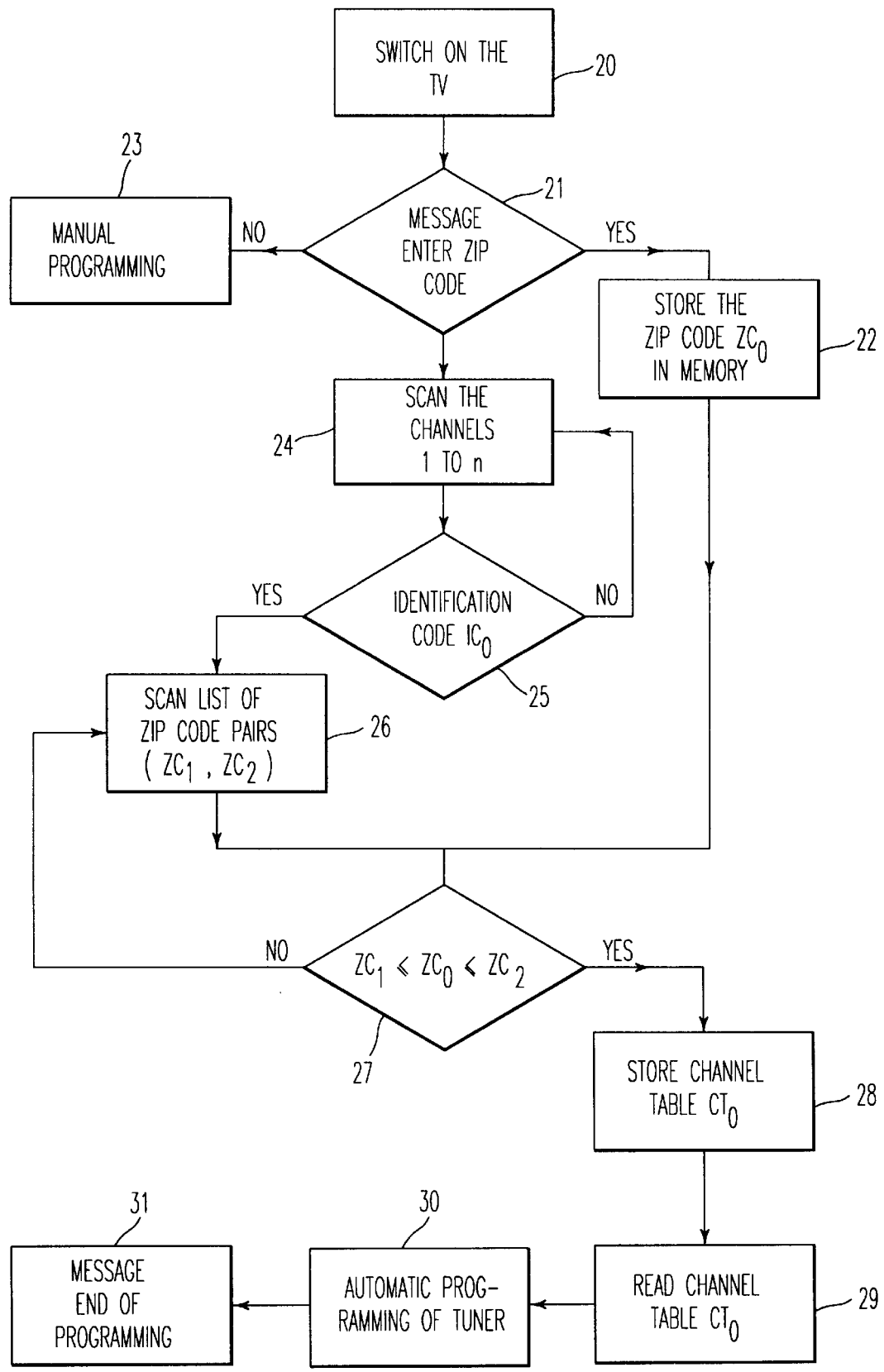
FIG. 2 shows the block diagram of an embodiment of the invention.

FIG. 2 shows the block diagram of an embodiment of the invention. The user switches on his television (20) which then displays a message asking the user to enter his ZIP code (21). If the user wishes to use the automatic programming, he will enter his ZIP code ZCO that is then stored in memory (22). If not, conventional manual programming is necessary (23).

The tuner scans the channels 1 to n (24) starting for example with the lowest frequency until it identifies the channel whose signal carries the identification code $IC_0$ and other special signals (25). In the case of Teletext-type signals in CEEFAX format, the special pages include channel tables CT corresponding to the station E associated with a pair of postal codes $ZC_1$ and $ZC_2$ representing for example the upper and lower limits of the ZIP codes in the region covered by this station. In other words, the code $ZC_1$ corresponds to the lowest possible ZIP code in the geographic area receiving programs from the station E, and $ZC_2$ corresponds to the highest possible ZIP code in this same geographic area ($ZC_2$ being greater than or equal to $ZC_1$). These pairs of codes ($ZC_1$ and $ZC_2$) are read (26) and compared with the ZIP code $ZC_0$ (27) stored in memory (22). When this value lies between $ZC_1$ and $ZC_2$ (27), the channel table corresponding to this couple ($ZC_1$, $ZC_2$) is sent directly to the tuner where it is used to program it immediately, or is stored in memory (28). In the latter case, the data in this table are then re-read (29) and the tuner is programmed (30) according to the values of these data. When the programming is complete a message can be displayed (31) to inform the user that the TV or recorder is ready for use.

The channels with their reception levels given by the AGC are preferably stored in memory. In this way, when a ZIP code $ZC_0$ corresponds to two or more channel tables, the method can select only the table corresponding to the best reception. It does this by systematically scanning all the data transmitted and recording the channel tables corresponding to the same ZIP code and the AGC levels of each of the channels and comparing the AGC levels. This selection may consist, for example, in adding the various channel levels for each table and retaining only the table having the highest total of AGC levels, in the case where the levels are taken for example to be the rectified voltage measured at the output of the AGC.

It is clear that when the user changes the geographical location of his TV receiver or video recorder, or installs a new set, the method according to the invention avoids any programming or re-programming action on the part of the user, since for every ZIP code there is a channel table corresponding to the TV station providing the best reception at this location.

If we consider the application of the method according to the invention in France and using CEEFAX data, we find that 80% of the country is covered by about 120 transmitters. In this case the automatic programming will take less than four seconds. To identify the ZIP code $ZC_0$ input by the user, 11 characters are required for the codes $ZC_1$ and $ZC_2$ identified (for example, 75001;75020). We assume there are only 6 TV channels, each one having a 3-character identification code (for example, TF1, FR2, FR3, CL+, ART and M06) and six frequencies (for example, 125.75, 138.25, etc.). The programming of the tuner requires about twenty characters (rank/standard/Gemstar code). In this case, it will therefore be necessary to transmit about 10,000 characters, equivalent to about ten Teletext pages in CEEFAX format for the 120 stations. Given that it is possible to send 3 pages of teletext per second using the line return of the signal, a total of less than four seconds is required to send all the essential data for the automatic programming according to the invention, if a single line return is allocated to the service. The transmission of data will be even faster if several line returns are allocated.

An example of a channel table would be the following character string:
75001/75020/TF1/125.75/111/FR2/138.25/112/FR3/ 145.25/113/CL+/2 72.75/114/ART/442.25/115/M06/ 380.25/

A variant of the method is to ask the user initially if he wishes to use the automatic programming (Yes/No) and, if so, to ask him to enter his ZIP code only when the channel carrying the special pages is identified by its code $IC_0$.

An improvement of the present invention is that, when a modification occurs in the channel table corresponding to the installation location, a special code to announce this modification is transmitted. The microprocessor of the TV recognizes this signal, starts the routine described above and the TV then reprograms itself without any intervention whatsoever by the user. This requires only a simple supplementary monitoring routine in the microprocessor. Another possibility would be that the TV reprograms itself automatically at regular intervals (once a month, for example). As in the example described above, one or more informative messages addressing the user can be displayed during the programming procedure.

It is obvious that all modes of transmission of the special data (identification code IC, ZIP codes ZC, channel tables CT) can be used within the framework of the present invention. For example, we could transmit the list of all the ZIP codes until the microprocessor routine recognizes the user's ZIP code $ZC_0$. Each corresponding channel table could be sent after each of the post codes or, if the ZIP code $ZC_0$ is memorized, all of these tables could be sent together after all the ZIP codes, along with another table giving the correspondence between the ZIP codes and the channel tables. Of course, this type of data transmission is much longer than in the example of FIG. 2.

For broadcasting by cable or satellite, the start message (21) can be to ask the user to indicate the cable option C or satellite by entering, for example, the name of the satellite. The programming is then performed in the same way as described earlier for terrestrial radio transmissions.

In order to prevent manufacturer who is a competitor from using the method on his equipment, an improvement would be to encode the digital signals, either in the general framework of a system of complete video encryption (of the type Eurocrypt or Videocrypt, for example), or by encryption of these special signals only. In the latter case, it would be necessary to equip the TV or video recorder with a device to decode these signals only.

As in the case of Teletext, the provider of these signals can also use these black lines to send other types of information, about himself or the manufacturer of the TV set, for example publicity information such as catalogs, addresses of sales outlets, special offers, etc.

Figure 3:
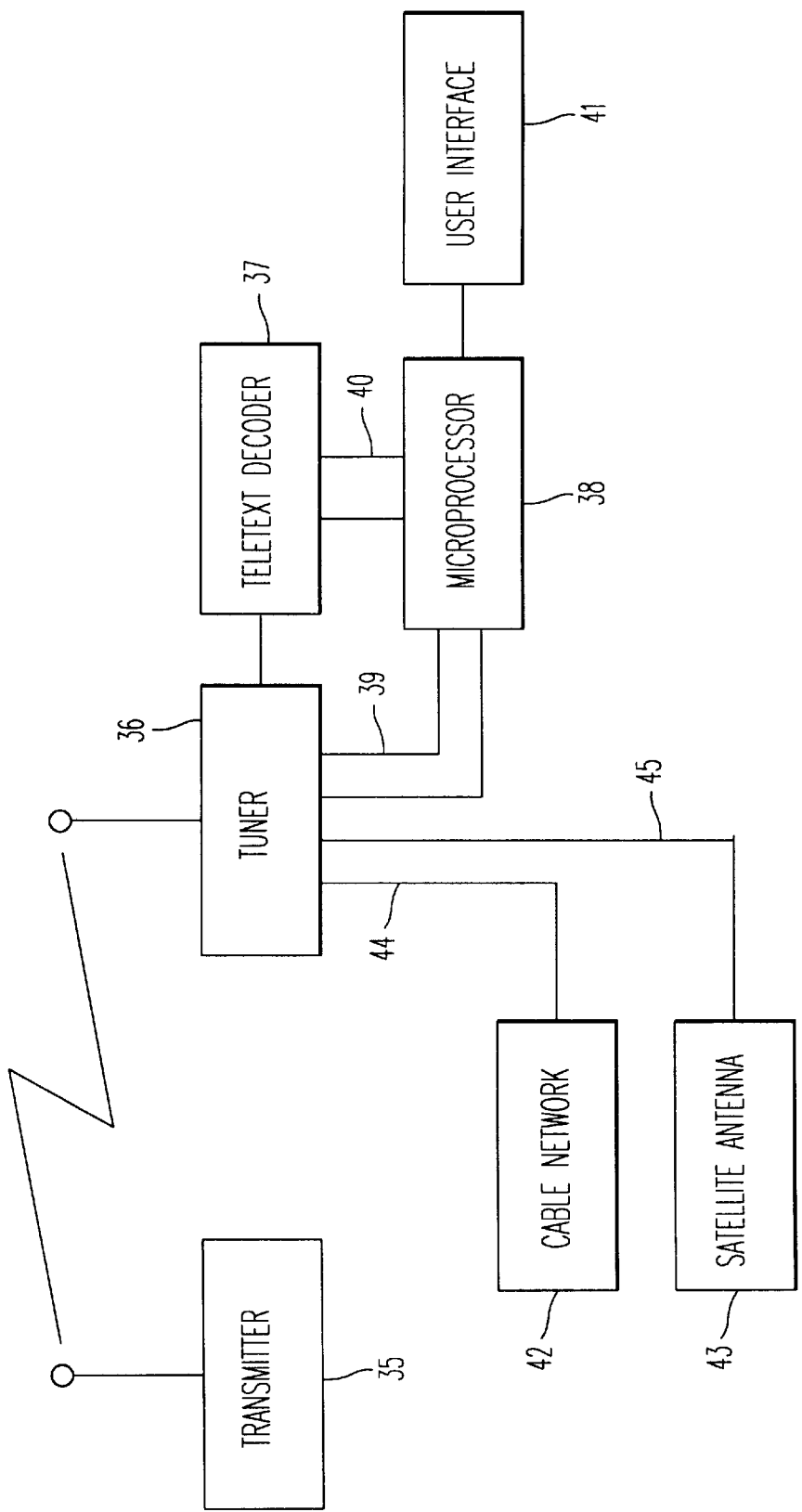
FIG. 3 shows an example of the device making use of the method according to the invention.

FIG. 3 represents a television broadcasting transmitter 35 that transmits video signals received by the tuner 36 of a TV or video recorder. This tuner 36 is connected to a CEEFAX decoder 37 for Teletext-type data (for example ITT's TP 3040 or Siemens' SDA 5273). The tuner 36 and the Teletext decoder 37 are controlled by a microprocessor 38 via buses 39 and 40. This microprocessor 38 includes a memory area containing the identification code $IC_0$ of the special data transmitted. This code might possibly be modified by these data if necessary by a simple programming means. The microprocessor 38 also contains a rewriteable memory area used to store the user's ZIP code and possibly the corresponding channel table. The user enters his ZIP code $ZC_0$ using an interface device 41 of known type including a control keypad and an infra-red transmitter and receiver. The microprocessor 38 starts the automatic programming method described above with reference to FIG. 2, receiving the special data via the bus 40. It programs the tuner via the bus 39.

To implement the method according to the invention that enables the programming of the television using a signal received via cable network 42 or a satellite via an antenna 43, it is necessary to equip the tuner with a suitable connector 44 or 45.

The present invention is applicable to all type of TV standards (PAL, PAL+, SECAM, NTSC, D2MAC, HDMAC, digital standards, etc.) and to all types of signal formats transmitted with the video signals. These signals may be compressed or not, and included in the line return (possible use of NICAM) or elsewhere, multiplexed with a digital signal.

Obviously, numerous modifications and variations of the present invention are possible in light of the above teachings. It is therefore to be understood that within the scope of the appended claims, the invention may be practiced otherwise than as specifically described herein.

What is claimed is:

1. A method for automatic programming of a television tuner and/or video recorder using a digital or analog composite video frequency signal, comprising:

receiving digital signals carried by part of a multiplexed digital data stream of the video frequency signal or by at least part of a signal not used for video information, the digital signals representing an identification code and at least one table of channels, the identification code and the table of channels corresponding to an emitter and identifiable by one or more postal codes;

recognizing the identification code of the digital signals by comparison with a code stored in a memory;

reading data carried by the digital signals;

identifying at least one of the table of channels corresponding to a location of an emitter serving a geographic location of the television tuner and/or video recorder based on a postal code, input by a user, corresponding to the geographic location; and automatically programming the television tuner and/or video recorder based on the identified table of channels.

2. The method according to claim 1, after the step of identification of the table of channels, comprising:

storing in a memory the table of channels corresponding to the input postal code; and wherein the step of automatically programming the television tuner and/or video recorder, comprises:

automatically programming the television tuner and/or video recorder based on the stored table of channels.

3. A method for automatic programming of a television tuner and/or video recorder using a digital or analog composite video frequency signal, comprising:

receiving digital signals carried by part of a multiplexed digital data stream of the video frequency signal or by at least part of a signal not used for video information, the digital signals representing an identification code and at least one table of channels, the identification code and the table of channels corresponding to an emitter and identifiable by one or more postal codes;

recognizing the identification code of the digital signals by comparison with a code stored in a memory;

reading data carried by the digital signals;

identifying several tables of channels corresponding to a location of an emitter serving a geographic location of the television tuner and/or video recorder based on a postal code, input by a user, corresponding to the geographic location;

storing in a memory the several tables of channels as well as reception levels provided by a gain amplification circuit of the tuner and/or video recorder for each of the several tables of channels;

comparing the provided reception levels and selection of a table of channels from the several tables of channels corresponding to a best reception level based on the provided reception levels; and automatically programming the tuner and/or video recorder using the selected table of channels.

4. The method according to claim 3, wherein the step of comparing the provided reception levels, comprises:

adding reception levels of all of the channels within a table of channels for each of the several tables of channels;

comparing totals of the added reception levels for each of the several tables of channels; and storing in a memory a table of channels from the several tables of channels having the largest total corresponding to a best reception level.

5. A method for automatic programming of a television tuner and/or video recorder using a digital or analog composite video frequency signal, comprising:

receiving digital signals carried by part of a multiplexed digital data stream of the video frequency signal or by at least part of a signal not used for video information, the digital signals representing an identification code and at least one table of channels, the identification code and the table of channels corresponding to an emitter and identifiable by one or more postal codes;

recognizing the identification code of the digital signals by comparison with a code stored in a memory;

reading data carried by the digital signals;

identifying at least one of the table of channels corresponding to a location of an emitter serving a geographic location of the television tuner and/or video recorder based on a postal code, input by a user, corresponding to the geographic location;

automatically programming the television tuner and/or video recorder based on the identified table of channels; and transmitting the data carried by the digital signals as teletext type data in a CEEFAX format.

6. The method according to any one of claims 1, further comprising:

transmitting the identification code as a teletext page number in a CEEFAX format.

7. The method according to any one of claims 1, further comprising:

transmitting the video frequency signal carrying the digital data by cable.

8. The method according to any one of claims 1, further comprising:

transmitting the video frequency signal carrying the digital data by a satellite.

9. A device for the automatic programming of a television tuner and/or a video recorder, comprising:

an emitter, a tuner, a CEEFAX decoder, a microprocessor, and a user interface device, wherein the device uses a programming method according to any one of claims 1.

* * * * *